United States Patent
Janson et al.

(10) Patent No.: US 6,535,997 B1
(45) Date of Patent: Mar. 18, 2003

(54) DATA INTEGRITY IN SMARTCARD TRANSACTIONS

(75) Inventors: Philippe A. Janson, Waedenswil (CH); Helmut Scherzer, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,093

(22) Filed: May 19, 1999

(51) Int. Cl.[7] ............................................... G06F 11/00
(52) U.S. Cl. ........................... 714/15; 707/202; 235/380
(58) Field of Search .............................. 714/15, 16, 18, 714/19; 707/202; 235/380; 902/22, 26; 710/102; 705/64, 65

(56) References Cited

U.S. PATENT DOCUMENTS

| | | | | | |
|---|---|---|---|---|---|
| 4,922,456 A | * | 5/1990 | Naddor et al. | ............... | 365/185 |
| 5,869,823 A | * | 2/1999 | Bublitz et al. | ............... | 235/380 |
| 6,070,795 A | * | 6/2000 | Feiken | ........................ | 235/375 |
| 6,119,946 A | * | 9/2000 | Teicher | ........................ | 235/492 |

* cited by examiner

*Primary Examiner*—Scott Baderman
(74) *Attorney, Agent, or Firm*—Ido Tuchman; Lewis Herzberg (57) ABSTRACT

The invention relates to data integrity in applications employing smartcards, in particular smartcards in connection with remote stations like personal or desktop card readers or similar inexpensive terminals. Since smartcards today are extensively used particularly in the financial and banking field, the data integrity issue is of particular importance. In such applications, any interrupted data transfer between the smartcard and a terminal can result in making the smartcard unusable and/or corrupt the data, any of which in turn often greatly affects the user. The solution according to the invention is, in brief, to apply an "adapted atomicity approach" to the smartcard environment, i.e. to adapt and use an atomic approach for smartcard transactions. To implement this, two essential features are incorporated, one being the provision and use of an internal trigger mechanism on the smartcard, the other being the provision and use of a failure-resistant recovery scheme on the smartcard, in particular a record index swapping scheme for data handling on the smartcard during the transaction.

23 Claims, 3 Drawing Sheets

| | *Index* (1 Byte) | *Value* (*n* Bytes) | *LRC (Check)* (1 Byte) |
|---|---|---|---|
| Record # 1 | 0 1 | < valid data > | valid LRC over Index | Value |
| Record # 2 | 0 2 | < valid data > | valid LRC over Index | Value |
| Spare Record | 0 0 | < invalid data > | valid LRC over Index | Value |

|  | *Index*<br>(1 Byte) | *Value*<br>(*n* Bytes) | *LRC (Check)*<br>(1 Byte) |
|---|---|---|---|
| Record # 1 | 0 1 | < valid data > | valid LRC over Index \| Value |
| Record # 2 | 0 2 | < valid data > | valid LRC over Index \| Value |
| Spare Record | 0 0 | < invalid data > | valid LRC over Index \| Value |

*Fig. 1*

| | Old State | Write Spare Record | Calculate Spare LRC | Update Spare ID | Clear old ID | Calculate Spare LRC | Calc. old Record LRC |
|---|---|---|---|---|---|---|---|
| Coding Example | 01: LRC:01<br>00: LRC:00 | 01: LRC:01<br>00: LRC:xx | 01: LRC:01<br>00: LRC:00 | 01: LRC:01<br>00: LRC:00 | 00: LRC:01<br>01: LRC:00 | 00: LRC:01<br>01: LRC:01 | 00: LRC:00<br>01: LRC:01 |
| Accident | 01: LRC:01<br>00: LRC:00 | 01: LRC:01<br>00: LRC:xx | 01: LRC:01<br>00: LRC:xx | 01: LRC:01<br>xx: LRC:00 | xx: LRC:01<br>01: LRC:00 | 00: LRC:01<br>01: LRC:xx | 00: LRC:xx<br>01: LRC:01 |
| Indication | ok | lrc: 00:xx | lrc: 00:xx | lrc: xx:00<br>missing 00 | lrc: xx:01<br>lrc: 01:00<br>missing 00 | lrc: 00:01<br>lrc: 01:xx | lrc: 00:xx |
| Repair action | ok | lrc: 00:00 | lrc: 00:00 | lrc: 00:00 | lrc: 00:01 | lrc: 01:01 | lrc: 00:00 |
| Achieved State | Old State | Old State | Old State | Old State | Clear old ID | Calculate Spare LRC | New State |
| Indication linked to ... | - | Calc. old Record LRC | Calc. old Record LRC | - | - | - | Write Spare Record +next. |
| Applied rule | - | a.) | a.) | b.) | c.) | d.) | a.) |

DATA INTEGRITY IN SMARTCARD TRANSACTIONS

DESCRIPTION

1. Field of the Invention

The invention relates to data integrity in applications employing smartcards, in particular smartcards in connection with remote stations like personal or desktop card readers or similar inexpensive terminals. In such applications, unless properly handled, any interruption of a data transfer between the smartcard and a terminal can result in making the smartcard unusable and/or corrupt the data, any of which in turn often greatly affects the user.

2. Background

Smartcards today have many different uses of which the use in the financial and banking field is a prominent one. In this field, the data integrity issue is of particular importance since personal financial data are usually highly sensitive and a failing smartcard may, at times, present a significant problem.

Data integrity in the context here means error-free data transmission between a data source or receiver and the smartcard, an error-free record of the occurred transmission and consistent data on both sides giving an accurate, uncorrupted picture of the transaction that has occurred, whether completed or not. Data corruption may be caused by various events: a line breakdown to the terminal, a power failure, human interaction—e.g. someone removes the smartcard from a terminal—or even intentionally by a fraudulent attempt.

Whereas normal software techniques may guarantee the validity of the data content through secure messaging protocols and the appropriate realization in the smartcard, situations may occur where the traditional methods do not successfully work. One of the potential threats, as mentioned above, is the power loss situation. While the smartcard alters data in its memory, it may reach states where the data to be modified is lost, neither the old value nor the new value is available after the power loss. Furthermore the smartcard can be in a state where only a restricted functionality is available or, worst case, the card does not work at all. While there are other exposures to the card which may scratch the data, e.g. temperature exposure, mechanical break, electromagnetic radiation, the power loss situation, no matter whether by intent of the user or not, is the most probable threat which may occur.

From the field of database systems, different approaches to solve these problems are already known. Generally, a database (like a smartcard can be regarded as) has to "know" only two states which may be defined as before changes and after changes caused by a transaction. Any other situation must be avoided. Database technology has defined the terms commitment and atomicity in this respect. A data commitment is an external trigger which tells the database that the data being submitted is complete and therefore is relevant to change the content of the database. Atomicity describes the idea that only two states (before and after) can exist. If a database guarantees the atomicity of a transaction, then it has a technical functionality to guarantee only these two states. In the following, some of the techniques known today shall be described and some of the used terms explained.

Atomic Transactions

For a better understanding, the term atomic transaction shall be explained in some detail. An atomic transaction is any computerized transaction, e.g. banking or reservation transaction, that appears to be instantaneous and indivisible in the sense that it either runs to successful completion or completely fails, leaving no trace in any computer, as if it has never started. The concept was formulated to deal with transactions such as bank transfers, which involve multiple information updates, e.g. subtracting money from one account A and then adding it to another account B, yet should not be interrupted by failures of a computer or network, or by conflict with other transactions taking place in between the update operations. The main reason is that this could leave the affected database records in an inconsistent state, e.g. money debited from A but not credited to B or vice versa.

All existing database and transactions processing systems (e.g. IBM's DB2 database system as well as others) implement a variety of mechanisms for making such transactions atomic, i.e. for allowing to roll them back without a trace or to force them to a successful completion in spite of inevitable failures or conflicts. Known techniques as Write-Ahead Logs (WAL), Intention Lists (ILs), Commit Records (CRs), Two-Phase Commit Protocols (TPCP) in distributed systems, etc., are documented in any classical textbook on the subject, e.g. P. A. Janson: Operating Systems Structures and Mechanisms, Academic Press, Inc., London, 1985, pp.175 et seq. An earlier reference is by W. H. Kohler: A Survey of Techniques for Synchronization and Recovery in Decentralized Computer Systems, ACM Computing Surveys 13, Vol. 2, pp. 149–184.

Write Ahead Log

Here, data being modified is written into a buffer separate from the database, the Write Ahead Log. Beside the data, additional information is available in this log related to the correct address where the data has to be placed into. The log is marked invalid during this time. When the data modification is committed, the log will be marked valid. The data contained in the log is now written to the database. If all data was written out of the log, it is marked invalid again.

If a power failure occurs while data is written into the Write Ahead Log, the system will find the Buffer invalid and the data will remain at the same state as before, i.e. prior to the update.

If a power failure occurs when the Write Ahead Log is valid, then the whole Log or at least all entries which have not been assigned as written will be transferred to the database. Multiple power failures during this phase will never stop the update of the database until the final new state is reached. The database will, then end always in the committed and updated state.

Backtracking

Another method which is just the inverse of the Write Ahead Log, is the Backtracking method. Again, a separate buffer, the Backtrack Buffer, is used. However, data being modified is written directly to the database, after the "old" data has been written to the Backtrack Buffer. Using this method, each such "backup" entry has to be marked valid individually after it has been written; then the new data is written to the database. When the input data is committed, the Backtrack Buffer is declared invalid. All backup entries are then discarded.

The advantage of this method is that the new data is earlier available in the database and does not have to be locked until the data input is committed.

If the power fails while the Backtrack Buffer is being written, all valid entries of the Backtrack Buffer will be rewritten to the database in order to bring the database back to the "old" state. If the power fails while new data is written to any database location, the appropriate backup data will be tagged as valid. Therefore, the data location will be restored with the old backup data on the next power bring-up. The data base will also end up with the "old" state. If the power fails after the commitment, the backup buffer is declared invalid and the new data content will remain in the database.

Background System

Small data bases typically have a duplicated "shadow" of the actual database, e.g. RAID systems in a server environment. There, the Write Ahead or Backtrack Buffers are replaced by a full spare data base, which serves as spare in case of a disaster other than a power failure, e.g. in case of a head crash on fixed disks. There are several possible solutions to synchronize this shadow database with the master database. Generally it can be said that those approaches are not relevant to smartcards because of their limited memory size.

Vector Reference Swapping

A modified scheme of the above described Write Ahead or Backtrack Buffer techniques is the idea to use a "spare" entry in a database. A list might have a particular number of rows plus one spare row. Whenever new data comes in, it will be written to the spare location. After the data is committed, the "old" row will be declared as spare while the previous spare row will get the index of the updated row.

If the power fails while data is written to the spare row, the database will not see any alteration after being repowered. If the power fails after the vector swapping, the new data is available in the previous spare row and the references are set to this row. The new state is found. Thus, the commitment problem is reduced to the correct swapping of the vectors.

Certainly the swap of the vectors has to be made using atomic transaction schemes. The main advantage of this method is that it is very fast, as only the index information has to be swapped instead of copying the data twice. The disadvantage is the more complicated structural topology, which requires one spare row on each table as explained in the above example.

For a number of reasons, the concept of such atomic transactions and the need to protect transactions with suitable logic has not yet been applied to smartcard systems. Some of the reasons shall be explained herein below.

First, practically all smartcard operating systems have been strictly sequential programs and thus obviated the need to protect against parallelism. In other words, since there was—and still is—no parallel execution of any processes, protection against any interference between simultaneous or nearly simultaneous processes appeared unnecessary.

Second, smartcards were used so far mainly in conjunction with ad-hoc, industry-specific, on-line; often rugged acceptance devices, mostly card readers, which devices tightly control the environment while in operation. The probability of such devices failing during a card operation is rather small, in particular since they usually keep the card within a closed and secure environment during processing and avoid uncontrolled user interaction. An example of such devices are bancomats which keep the smartcard within the machine, i.e. out of reach of the customer, as long as processing takes place.

Hence atomicity accidents have not been an issue until now, and the need for atomicity protection has not been explicitly recognized. However, the recent emergence of low-cost, consumer-quality, hand-held readers for personal use and of simple desktop readers for the supermarket environment, to name just two, where the operational environment does not offer any protection against user interference or power supply failures, changes the boundary conditions and makes the need to protect card operations an absolute requirement.

A further and perhaps more important aspect is that there are at least two significant differences between a smartcard and a classical computer system making the straightforward application or adaptation of known atomicity solutions to the smartcard environment practically impossible.

First, after a failure, a classical transaction system will spontaneously try to reconnect to its environment, figure out whether anything got interrupted and either back out of it or complete it as may be appropriate. This assumption cannot be made for smartcards. If a card operation is interrupted— e.g. because the user removed the card from the reader, thus cutting power supply—there is absolutely no guarantee that the user will ever reinsert it into a reader, let alone into the same reader, to complete or roll back the interrupted operation. For all practical purposes, the user knows nothing about atomic transactions and is not even aware that he or she interrupted anything critical. Thus, any concept or design assuming automated recovery after a failure will not work.

Second, classical transactions systems usually have ample computing resources and few environmental constraints to implement the necessary atomicity protection and recovery mechanisms. This is not the case for smartcards. They have very limited space and processing power and must further cope with nonvolatile memory technologies that allow updating any given memory location only a limited number of times—around 10 000 now, but going on to 100 000 times with today's technology.

In a pay-per-view TV environment, i.e. in a quite different field, U.S. Pat. No. 4,922,456 by Naddor et al. discloses a method which appears to lead into a somewhat similar direction, though it is mainly directed to preventing the wear out of a nonvolatile memory. The Naddor patent describes a method where data is written into a memory with a plurality of memory locations by first writing sufficient information into a double buffer comprising at least two memory locations to reconstruct the writing operation. Then, a flag is set to indicate that the information in the double buffer is accurate. The write operation is then performed, followed by the clearing of the flag. Finally, the two (or more) memory locations are moved through the memory to achieve the desired wear out prevention.

Based on the above, it is the general object of the present invention to provide a protection approach within the smartcard environment which approach is comparable to the data integrity mechanisms used in "large" database and transaction systems. More detailed, the main and foremost object of the present invention is to provide data integrity and protection against data loss or corruption both on the smartcard and in any associated data base.

A further, more general object is to guarantee the continued usability of a smartcard despite any previous interruption of a transaction to or from this smartcard, no matter what caused the interruption.

SUMMARY OF THE INVENTION

The solution according to the present invention is, in brief, to apply an "adapted atomicity approach" to the smartcard environment. The present invention shows a way how to adapt and use an atomic approach for smartcard transactions, i.e. for transaction between an external database and a smartcard.

As detailed in the appended claims, the present invention can be described as incorporating two essential features, which, in combination, can be considered to be the gist of the invention. One feature, in brief, is the provision and use of an internal trigger mechanism on the smartcard. The second essential feature, again in brief, is the provision and use of a so-called vector reference swapping scheme for data handling on the smartcard during the transaction.

Another feature contributing to the present invention is the use of a state-oriented scheme which sets the smartcard always either into the old state before a command was sent to the card, or into the new state which was envisaged to be achieved.

There are further features detailed in the claims. A particular interesting one may be considered the novel approach to select a particular granularity of the transaction processes, an approach appearing quite suitable for the smartcard environment. It may further encompass a recovery mechanism residing outside the smartcard, being appropriately authorized, and using suitable cryptographic means.

Another feature of the novel approach according to the invention is the use of a "spare record" within the transaction process. This spare record may be seen as part of the recovery mechanism, allowing to recover the correct data whenever an interrupt occurs during the transaction.

To extend atomicity protection mechanisms to smartcards within the boundaries of their above described constraints results in an unmatched security of an appropriately equipped smartcard processing system. In the presently available systems, a new transaction cannot be started when the smartcard was left in a inconsistent state by a previous transaction; thus it usually becomes unusable which in turn may result in considerable trouble for the owner or user. If, however, a smartcard system is equipped with mechanisms according to the invention, which mechanisms allow to detect and recover from failure during a previous transaction, such a system has a significant advantage over a smartcard system without these mechanisms.

INTRODUCTION TO THE INVENTION

The following concentrates on an application which uses the vector reference swapping method, briefly mentioned above. A general mechanism is proposed how to commit the index values of the records.

Since the invention will be, to a large extent, implemented in software, there is more than one programming method, including a variety of data and control structures, which can embody the invention. An example shall be given below as a preferred embodiment of the invention according to the general inventive concept outlined above.

In principle, the present invention addresses atomicity on smartcards in general and is not limited to any particular granularity. However, to be able to describe and progressively build up a broad spectrum of mechanisms addressing the issue at any level, the description shall start at the bottom, with an atomicity scope of single file records on one card, meaning data records or control headers in the ISO sense, and one single card command.

When dealing with atomicity, a first parameter that needs definition is the granularity of the mechanism proposed. In classical transaction systems, some mechanisms address the atomicity of individual records (e.g. duplicated atomic stable storage), individual files (e.g. shadow paging), sets of files on the same computer system (e.g. WAL), or set of files across multiple systems (e.g. TPCP).

To break the problem and its explanation down, the whole complex shall be described in several steps:

The WAL (Write Ahead Log)

Normal Operation

Recovery and Distributed Transactions

Different Granularities, and

Parallelism (for future cards).

The WAL (Write Ahead Log)

The smartcard operating system devotes a small area of its nonvolatile memory (NVM, implemented by EEPROM or FLASH technology) to atomicity protection as Write Ahead Log. That area may be managed as any typical WAL in a classical operating system. Given the storage limitations of smartcards, the following design should be the minimum.

Within the WAL area, the operating system devotes one location, typically a 32-bit word or page writeable in one memory cycle, to an atomic transaction flag. This flag will at any time contain one of three values:

EMPTY (the default value for the NVM technology),

ABORTED (meaning an atomic transaction is in progress), or

COMMITED (meaning it completed its real work but still needs to update the original data with the new values).

Next, the WAL contains a command buffer area capable of holding the largest command the card may possibly receive from its interface.

Finally the WAL must contain a data area. The data area must have room for original data (so a transaction can be backed up to its start point as if it never happened) and updated data (so a transaction can be rolled forward to completion if it reached its end point but did not have time to update the original data before a failure happened).

Classical atomic techniques allocate this data space either in the WAL area itself (in-WAL) or within the normal data space (in-file), with the WAL containing just pointers to the data records. Since space is usually scarce on a smartcard, it is preferable to leave original data where it is and store in the WAL just pointers to it.

Thus the WAL data area must contain a large enough vector of pointers to point at the largest set of records that any atomic transaction command will ever update on the card—say N records. Each such pointer must of course include some file and record identification tag, as is usual in smartcard file formats, to allow the card software to know what is stored where.

For the update data, both in-WAL and in-file designs are possible. The choice of which one to apply is a matter of which one requires less space on the given card.

If the particular smartcard at hand contains many files with varying record sizes, but any particular atomic transaction updates only a small fraction of these files, then enough storage must be allocated in the WAL to contain only the largest number (N) of largest size records that any atomic transaction command will ever update at once (in-WAL update). Alternatively, if the card contains few files, or most files do get affected by most atomic transactions, then spare records and an associated mechanism to link them may be allocated within each file (in-file update). This latter approach should in general be the preferred one, given typical smartcard file structures, especially in the future, as spare records might be available in every file by design. In this latter case, the WAL need only contain pointers to the particular spare records updated by the ongoing transaction.

Normal Operation

When a card is powered up, it checks the atomic transaction flag. If the flag is set to the distinguished value ABORTED, the card concludes that some earlier atomic transaction was interrupted and the card needs rollback recovery. It may post this condition to its interface and will in any case refuse any command from that interface with a corresponding error code, except recovery commands of course (see below). Another failure during this process cannot make things worse since the transaction was aborted anyway.

If the flag is set to COMMITTED, the card deduces that some transaction was interrupted before it could update all the original file records it meant to, but at least it had finished computing the new values of these records and these can thus be found either in the WAL itself or in spare file records pointed to by the WAL. The card thus proceeds to roll the old transaction forward, i.e. to make the old records become the new ones either by overwriting the old ones in place (in-WAL updates) or by linking the new ones from the spare list to the real files and returning the original ones from the file to the spare list (in-file updates). Either way, when all actual updating is completed, the card resets the flag to the default EMPTY state and proceeds as below. Another failure during this latter operation and before the EMPTY stage cannot break things since all new updates are in the WAL or the spare records listed in the WAL.

If the flag is found EMPTY at power-on, the card will accept an incoming command and analyze it to decide whether it belongs to the class needing atomic protection or not. If not, meaning the particular command does presumably not update anything on the card, the command may be executed right away. If yes, the card will start by copying the command into the WAL command buffer and setting the atomic transaction flag to ABORTED, meaning the transaction is starting and busy computing the new values of the updated records. If a failure occurs during that time, the transaction must be rolled back, leaving all original data unaffected.

As soon as the transaction has computed all new record values and updated them in the WAL or in the spare records, but before updating any original file, it marks the WAL flag as COMMITTED, meaning the real work is done but some storage copying and housekeeping is still needed. When that stage is finally reached and all original data is updated, the card clears the WAL flag to the EMPTY state, thus indicating that the card has returned to a restive operational state, awaiting the next command.

Recovery and Distributed Transactions

Given the above description, recovery operation in case of failure should be clear. While the card WAL flag is in EMPTY state, all is in order and no recovery is needed. If the flag is found in COMMITTED state, some storage copying and housekeeping are necessary, but the card can take care of it internally. If the flag is found in ABORTED state, the condition must be notified or reported by an error code to the external environment. From a card point of view, there is little to do but reset the flag to EMPTY. However, the aborted transaction may have been a distributed transaction involving external computing elements where some undoing may be needed, e.g. a money transfer between the card and its environment (perhaps another card) in either direction may have been interrupted after the environment committed it, but before it could tell the card to commit it, in which case some money clearly got lost or duplicated, and outside intervention is required to reconcile the distributed transaction.

To allow such reconciliation, it must be possible to issue a recovery command against the smartcard to find out which command was being executed when the failure occurred. To this end, an authorized outside agent must be allowed to read a (possibly encrypted) copy of the WAL command buffer. It is then up to the application protocol and outside the scope of what shall be described here to include enough information in that command to allow the authorized application owners to reconcile the overall distributed transaction, for instance by matching some transaction id between the aborted command on the card and some other record it may have seen or will see from some other terminal or card which was involved in the same transaction.

This may make the smartcard unusable until outside intervention can take place, which may require going to some specially authorized online terminal. This is however unavoidably required by the application semantics since it is not possible to know in what state the card is in general, and one cannot run the risk of resuming normal operation before insuring consistency of the card content.

Different Granularities

The description so far assumed that the scope of a transaction was one single card command. In reality, some commands may go through several unrelated steps so they really equate to a sequence of commands. This can clearly be realized by running through several cycles of the above EMPTY-ABORTED-COMMITTED-EMPTY scenario.

Conversely, some transactions may straddle several card commands. That could be supported by allowing selected external commands to start and end transactions explicitly and maintaining several WALs such as the one used so far inside the card, so none of them can commit before the external card environment says so. This would clearly be beneficial to and help ease recovery of scenarios such as the distributed recovery one just described.

More interestingly, the scenario here described so far is such that the card can engage in a single command at a time. If a failure aborts that command and external intervention is needed, a user may be deprived of his/her card for a while. This may be fine for single-application scenarios. However, more and more multi-application cards appear on the market and there is no reason to block a whole card just because one single application is hung up needing recovery. In such cards, a different WAL file may be maintained for each application, so that the failure of one does not prevent the use of the others.

Parallelism

This latter scenario can be generalized to future cards, where several commands to different card applications may be issued in parallel and the card may, or in fact, will need a multi-tasking operating system. In such a case, multiple WAL files should also be maintained. Then, individual files and even records that may be shared across applications will need to carry locks to make sure applications cannot conflict with one another in updating files.

Simplification for Minimal Secure Operation

Since multiple WAL files and locks appear to be beyond the needs of today's applications and, perhaps, the capabilities of today's technology, a more "classical case" shall be addressed in the following.

The fact today is that simple smartcards will not even have sufficient room for one single WAL. In such cases, at the very least a degenerate WAL is needed that contains just the flag and the ongoing command. Updating may be done in place, realizing of course that transactions are then not recoverable without outside intervention since data will get clobbered in case of failure. Having at least the WAL flag and command would however cause the card to fail in a known safe way, alert the user to contact a maintenance authority, and allow resetting the card in a suitable way depending on what command got interrupted. Hand-held readers should refrain from issuing atomic commands against card applications designed with such a degenerate WAL because they would invariably block the card and require outside intervention every time the card is pulled out before an operation can complete. If atomic commands are unavoidable, then a minimal number of spare records must be allocated in critical files to allow recovery without outside intervention.

Technology

A WAL will of course be written more often than anything else, e.g. the flag at least three times per transaction. This could be a problem with certain older EEPROM technologies where the number of write cycles is limited to some 10,000, meaning no more than some 3000 transactions could be carried out before the card may become unwriteable. This limitation is however rapidly becoming a concern of the past since latest technologies allow close to 100,000 write cycles, thus allowing 30,000 transactions over the lifetime of the card, which is typically a few, say two or three, years. This should allow around 30 or more transactions per day for a couple of years, which few cards are likely to reach in practice.

After these more general remarks, an embodiment of the invention shall be described in the following with reference to the drawings in which

DETAILED DESCRIPTION OF AN EMBODIMENT

After the more general introduction above, the following section concentrates on an application which uses the vector reference swapping method to implement atomicity of commands affecting single individual files on a smartcard. A mechanism is proposed how to commit the index values of the records to implement the equivalent of an in-file WAL.

The Basic Ideas

The first basic idea of this embodiment of the present invention is that the smartcard generates an internal trigger for the appropriate commitment of the data sent. One of the proposed solutions is to execute this trigger always between the completion of the present command and the response the card returns to the calling authority. However, the scope of the invention allows the use of any other internal trigger. This can be a threshold in terms of memory usage, application progress, or other indicators.

The second basic idea of this embodiment of the present invention is to introduce failure-resistant index swapping schemes. In order to implement single-file command atomicity, a "vector reference swapping" scheme can be implemented in smartcards. As the level of atomicity is directly related to the reliability of the vector swapping scheme, a general idea is introduced how to achieve the desired level of atomicity. An example for a concrete realization is given to demonstrate the feasibility of this approach.

The general approach for implementing the second basic idea is to use any redundancy in the record layout to determine the intermediate states of progress while the index vectors are changed. If one considers the change of vectors as an n-step mechanism, it is claimed to achieve any of the first or the last step starting from any step between the first and the last step. This conforms to a power failure situation while the index vectors are changed. A change of index vectors for example might be a 9-step procedure. If the power fails in step 5, the system according to the invention must be able to determine that an interruption occurred, to determine the actual step when the interruption occurred, and to reach any of the first or the last steps state which will be either the "old" data situation or the "new" data situation (i.e. either the vectors are swapped or they are not).

Figure 1:
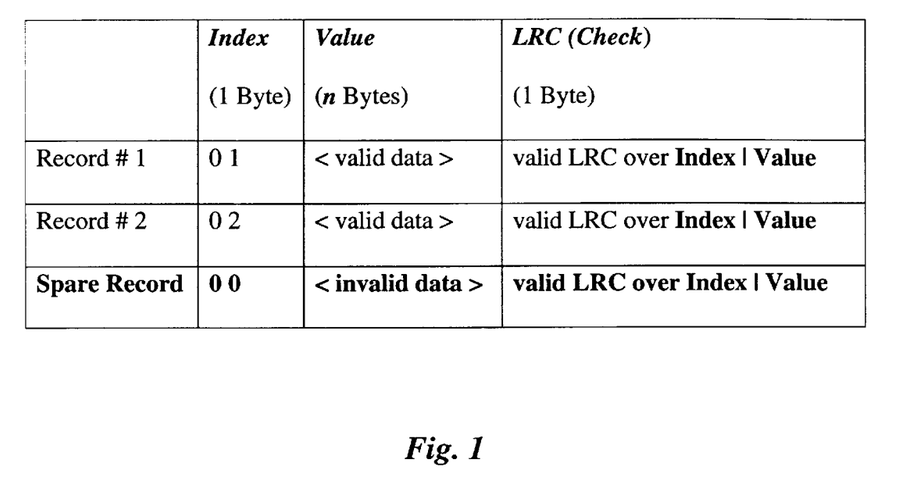
FIG. 1 shows a smartcard record layout.

For the visualization of the second idea, an example is given in the next paragraphs in connection with the table of FIG. 1 which shows the associated smartcard record layout.

The Smartcard Record Layout

As shown in the table of FIG. 1, each record of a file contains an index byte, a value field and a LRC byte (check byte). The index byte codes the record number. The value field contains the actual content of the record. The check byte calculated is the LRC value of the index byte and the value field. From these definitions a few conclusions may be made:

1. The XOR-sum calculated over index-value-LRC is always 00x in a "healthy" record.

2. The XOR-sum calculated over value-LRC results in a pointer value equal the index in a healthy record.

3. The XOR-sum calculated over index-value results in the LRC value in a healthy record.

Since the value of the index byte is relevant for the further discussion, we define a notation. Being given a record with index, data field and check byte, the record shall be represented as:

a:b with a=value of index byte and b=XOR [value field+LRC].

Using this notation, we can conclude that in a healthy record a=b is always valid, allowing a healthy record immediately to be recognized as an a:a pair. This notation will be used throughout the following text. Here is an example:

02:02

This designates a healthy record with the record ID 02. The XOR-calculation over the value field and the LRC yields a pointer indicating also 02, so that the XOR-sum of the index byte and the pointer field represents a sum over all bytes and will be zero in a healthy record.

02:03

The index byte of this record is again 02. However, the pointer field indicates a value of 03. It can clearly be seen that this record is defective.

Another observation may be made, namely that the present scheme defines some redundancy. For instance, if one knows by design that in a defective record the index byte must be defective, then one may always rebuild the index byte by calculating the XOR sum of the pointer value and the LRC. This redundancy is used and is an essential condition for the correct function of the proposed scheme according to the invention.

The Spare Record

In the following, the already mentioned spare records will be used. The basic principle of such a spare record, though in a different environment, was described in a patent application by Walter Häanel and Martin Witzel, German Published Patent Application Ser. No. 08/778,801.

In essence, in a system and a smartcard according to the invention, a spare record is held for each created file. While the records are typically numbered from one 1 to n (n<254, usually), the spare record contains the index 00. When a file is created, the spare record is automatically allocated. A healthy spare record in the above notation would be noted as 00:00.

The spare record is used whenever an APPEND or an UPDATE on the file's records takes place. The new or modified data will first be copied into the spare record. After this has happened, the appropriate security mechanisms are checked. If this check completes correctly, the index byte of the spare record and the old record are swapped to make the spare record the new updated record.

For an APPEND, the situation is slightly modified. Again the spare record is written, however swapping the index bytes will be done by declaring a new spare record while indexing the new spare record with the new record ID.

The Spare Record Power Failure Problem and its Solution

A power failure while writing the value field of a spare record does not destroy valuable information since the old record content remains correct. Using LRC techniques, it is obvious to someone skilled in the art, that a bad spare record will be found. How to treat this situation in detail according to this implementation of the invention will be demonstrated later. The critical step in a power failure situation is the exchange of the index bytes. If the power fails during the time the index bytes are exchanged, it may be impossible to retain the correct information and the card may be left in an undetermined state, unless the present invention is used.

The solution for this problem offered by the present invention has been proven free of stochastic trapdoors, whereby some particular values could effect the system in a critical way. Here, the invention uses a state-oriented scheme which sets the smartcard always either into the old state before the command was sent to the card, or into the new state which was envisaged to be achieved. The solution according to the present invention requires the ability to write single bytes instead of pages into the EEPROM. However, this is no problem since most of today's available smartcards provide this possibility anyway.

The solution to the power failure problem can be outlined as follows. As mentioned above, the critical step of a record update transaction is swapping the index bytes. Consequently, the proposed method protects this step. A self-repair scheme is realized through an infinite state machine which is entered according to the flavor of the defect which was recognized and which ends its infinite loop after a stable state of the records has been achieved.

Figure 2:
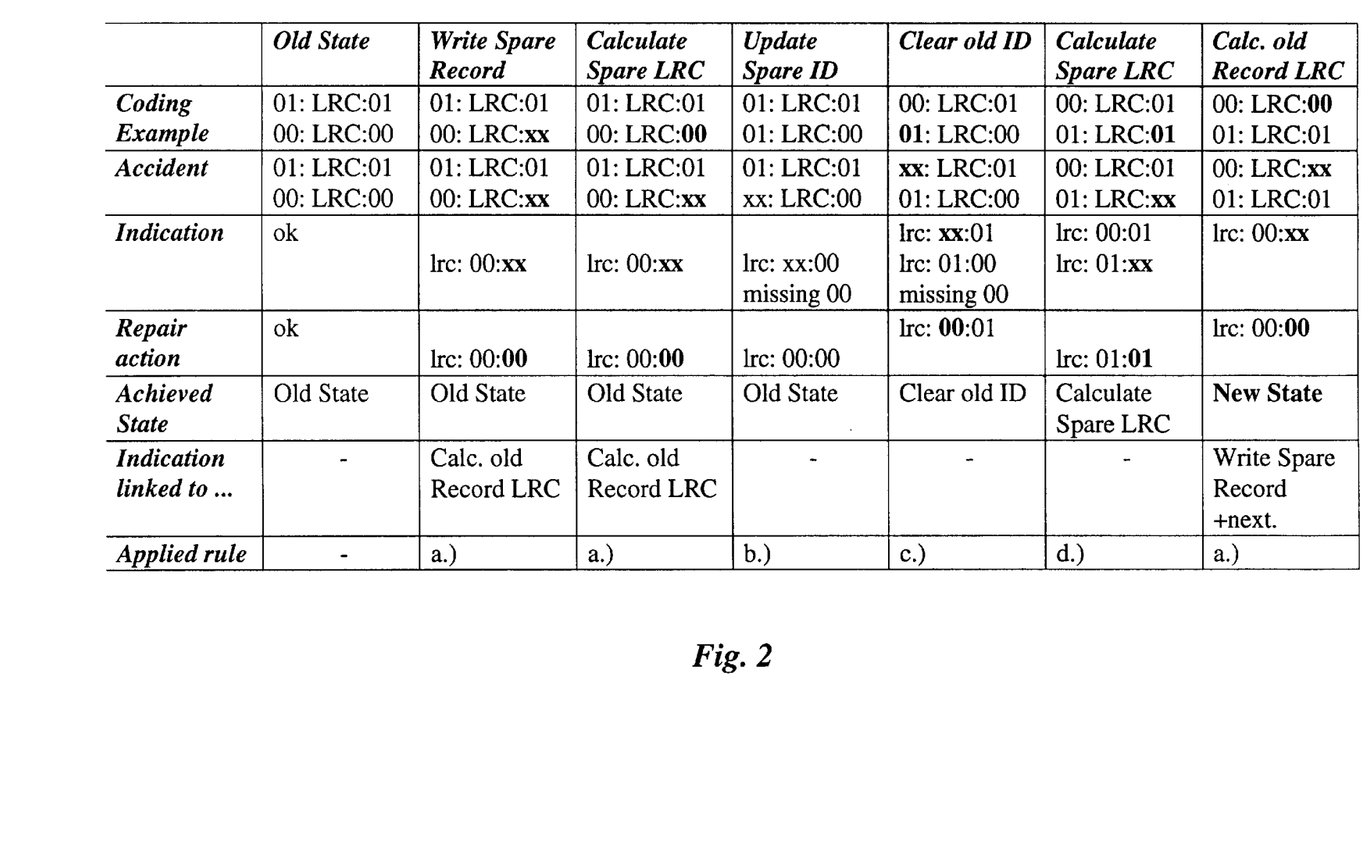
FIG. 2 shows the possible states being passed for various cases.

The table in FIG. 2 demonstrates the possible states being passed for the correct and the power failure case.

The "Coding Example" row indicates how the addresses of the spare record and the old record are to be swapped. The next row, labeled "Accident", defines the states which have to be considered in case of a power failure. This row demonstrates the worst case condition as the byte to be written is assumed to be totally undetermined (denoted as xx).

The "Indication" row presents those states which are seen after the card has suffered power failure and is powered up again. As the card has no further information which record was to be written and where the spare record was, it has to regenerate this information from the redundancy found through the LRC protection. This row therefore displays that information which is considered erroneous after the records of the card have been checked for LRC consistency. Different indications may be found, either there is no spare record available, or the pointer byte of the defective record points to 00.

Checking the "Indication" row, it can be recognized that the indication "01:xx" never appears alone. This is important, as it covers the most probable case, namely the case that a record fails through a bad EEPROM cell, which results most likely from a power failure during a writing process.

The row "Repair Action" indicates the action taken by the state machine to achieve the next state. In all cases the undetermined value "xx" is altered such that a next determined state is achieved. Another power failure during this repair action can not hurt the card. This is obvious, as the worst case which could happen is that the undetermined value is again undetermined.

The "Achieved State" row reflects the situation, i.e. the state, entered after a successful repair action. This new state may still be subject to further alteration—however as the state machine is being defined infinite, it will continue the evolution into a state without further indications.

The next row, labeled "Indication linked to . . . ", is an important check whether the rules applied (following row "Applied rule") are not contradictory. Some of the indications are similar, these are considered as "linked". Consequently, the card can only apply the same rule for this indication. This row only serves as a check function to allow testing whether the rules will apply correctly.

The row "Applied Rule" finally defines rules according to which the operating system may work out the next state to be entered. These rules are closely driven by the indication row, however, they represent in a more appropriate way how the processor should work out the repair action. The rules are detailed below in connection with the graph of FIG. 3.

The States

The columns in the table of FIG. 2 represent the possible states being entered during a correct swap procedure. As from each to each column, one byte is written in the EEPROM of the smartcard, each of the columns has an accident situation and an indication. The accident is always considered "worst case", leaving the written byte in undetermined state "xx".

The Old State simply shows the record prior to any alteration. If a record is updated, first the data field of the spare record will be overwritten with the new record data. This will obviously leave the spare record with an incorrect LRC value. If the power fails during the writing of the new record data, the card will be found in the Write Spare Record state—indicated by a "defect" spare record. The appropriate action on this situation is to repair the LRC of the spare record. After a power failure, this is a stable state for the state machine. The defective data resides in the spare record, however this is irrelevant as there is no assumption made on the default data value of the spare record. After the repair action, the card has a correct spare record again and none of the other data has been altered.

However, if no power failure occurred during the writing of the spare record, then the card itself will also calculate the LRC of the spare record. After the spare record LRC has been updated, the card is therefore in the Calculate Spare LRC state. The possible accident is a power failure when writing the LRC of the spare record. According to the state Write Spare Record, the repair action would again recalculate the LRC of the spare record. From the Calculate Spare LRC state, the machine will start to swap the bytes.

To swap the index bytes of the spare record and the old record, the card tries to achieve the Update Spare ID state. The record ID of the new record will be written to the spare record in this case. Consequently, any value written to the spare record ID will again make the spare record "defective" with respect to its LRC sum.

However, a power failure would appear to the card as a lost spare record, but another record is found with a pointer value of 00. This indication of an accident would be recovered by setting the index of the defect record to 00, bringing it back to the spare record state.

If the card succeeds to achieve the Update Spare ID state, it may try to enter the Clear old ID state. To achieve this, it tries to write a 00 to the old record ID. While the pointer value of the old record still points on the old record ID, the writing of this 00 may fail because of a power loss. In this case, the card is left in the accidental state without spare record, but with one defective record having a pointer value 00 and one defective record with a pointer value not equal to 00. This is the most complicated case and the state machine recovers it into the Calculate Spare LRC state by setting the record ID of that record with a pointer value not equal 00 to zero. This corresponds to the action being taken originally in the Clear old ID state.

If the state machine finds itself in the Clear old ID state, it tries to calculate the LRC of the "old" spare record. If the power fails now, the LRC of this "old" spare will be any value indicated by "xx". Finding a defective spare record and one other defective record after the power comes back is a unique indication, however. For this situation, a rule may therefore be defined to update the LRC of the defective record. If done successfully, the card automatically reaches the desired Calculate Spare LRC state. As a matter of fact, such state had been described already before the change, however it can be seen from the table in FIG. 2 that the same rules apply to reach the desired final state.

If the card has reached the Calculate Spare LRC state, it tries to achieve the Calculate old Record LRC state which is the final state in order to accomplish the update record function. Therefore, the LRCs of the "old" record and the present spare record are calculated. If the power fails during this update, the machine remains in the Calculate Spare LRC state. However, the rule to handle this situation is already known from the very first state: as a defective spare record is found after power-on, the rule states to update the LRC of the spare record. If applied to the current state, it does exactly what was scheduled by the sequence anyway. Thus, the card will for sure reach the final state.

It can be concluded that the above scenarios clearly prove the feasibility of the proposed inventive concept. The scheme avoids one special situation, namely the situation which indicates the existence of only one defective non-spare record. This was particular important, since this situation is the most probable one for any (unwanted) alteration of data in the EEPROM due to reasons other than power failures. The probability for any other of the described indications is much lower. Therefore, using the redundancy does not harm the level of data protection by the LRC character.

Figure 3:
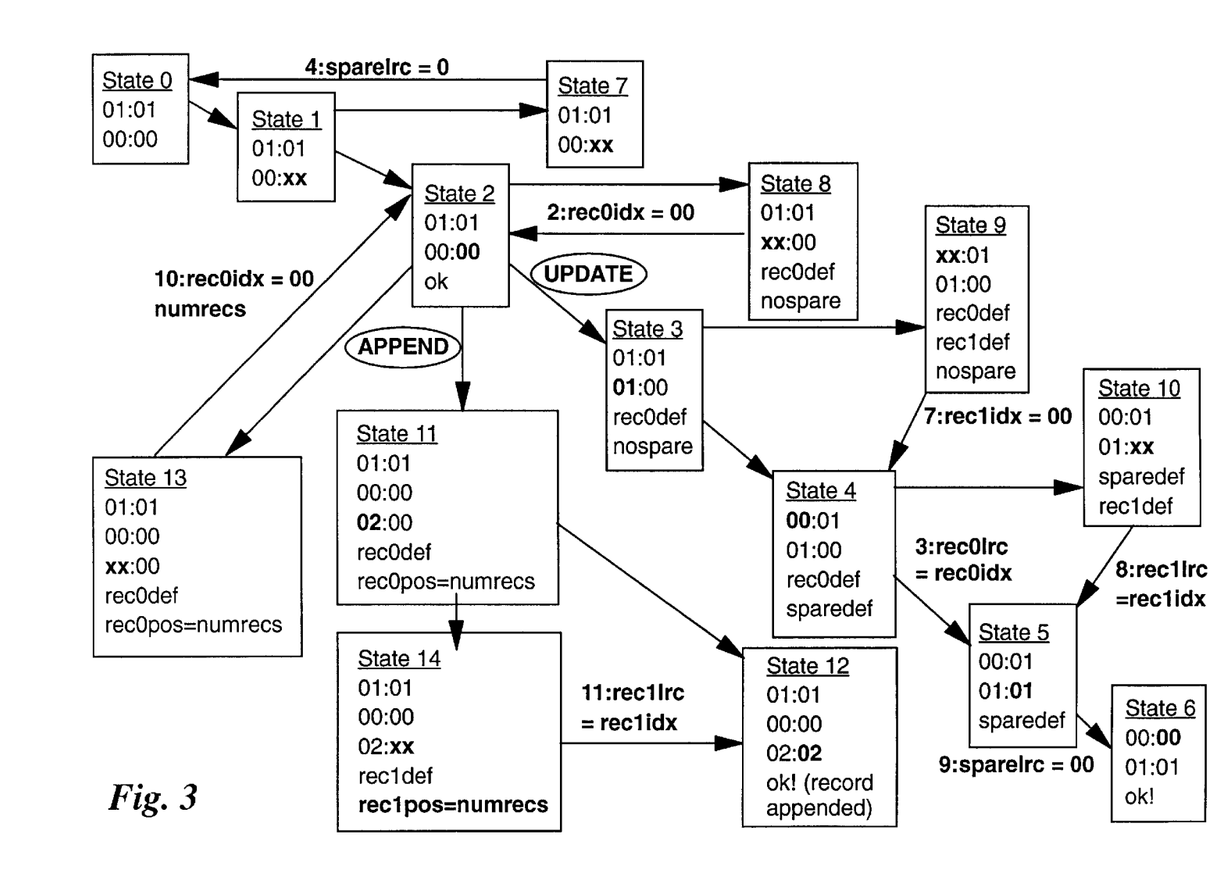
FIG. 3 shows the spare record index update.

FIG. 3 finally shows the different states for achieving the desired data integrity for an updated record in a graphical form, i.e. a graphical representation of the described concept. The main diagonal (upper left to lower right) defines a state path for the ordinary case without any power interrupt. The four boxes above the main diagonal define the possible accidental cases which are reached in case the power drops during a state transition in the main diagonal. The remarks on the arrows indicate the appropriate repair actions according to the rules given in the description above.

States 11 and 12 show the appropriate typical path for an APPEND RECORD state transition, while states 13 and 14 define the possible accidents for these steps.

Finally, for a better understanding, a mapping of the state numbers of FIG. 3, "State 0" through "State 14", to the states described in FIG. 2 shall be given. The states of FIG. 3 are given in the first column, the second column shows the corresponding state names of FIG. 2.

State 0=Old State
State 1=Write Spare Record
State 2=Calculate Spare LRC
State 3=Update Spare ID
State 4=Clear Old ID
State 5=Calculate Spare LRC
State 6=Calc. old Record LRC
State 7=Write Spare Record-Accident
State 8=Calculate Spare LRC-Accident
State 9=Clear Old ID-Accident
State 10=Calculate Spare LRC-Accident States 11 through 14 of FIG. 3 correspond to the APPEND RECORD mechanisms and are not explicitly addressed in FIG. 2.

While the present invention has been shown with reference to a particular embodiment, it is obvious to someone skilled in the art that it can be adapted to match the environment in which it is going to be used. The inventive principle can be applied to correct errors caused by power failures, interrupted transactions, fraudulent or other unauthorized modifications on the card, to name a few.

What is claimed is:

1. A method of managing a transaction of data between an external system and a smartcard, said transaction using an error correction scheme, said method implementing a data integrity scheme comprising:
   initiating an atomic transaction to modify an existing data record on said smartcard;
   processing said atomic transaction;
   monitoring on said smartcard whether said atomic transaction is successfully completed;
   providing on the smartcard a failure-resistant recovery scheme, in particular a failure-resistant record index swapping scheme; and
   using an LRC error correction scheme.

2. A transaction managing method according to claim 1, wherein the monitoring step on the smartcard comprises:
   determining whether the atomic transaction is successfully completed, and
   if so, triggering internally on said smartcard, without external interaction, a record commitment and subsequently modifying the existing data record, or
   if not, recovering lost data internally on said smartcard by exploiting available redundancy of the error correction scheme.

3. A transaction managing method according to claim 1, further comprising:
   providing a spare record on the smartcard,
   first writing modified data into said spare record, and
   reassigning the spare record as updated record if the atomic transaction is successfully completed.

4. The transaction managing method according to claim 3, wherein
   in the case of new data replacing data of an existing record, the new data being written into an existing spare record and the reassignment is carried out by swapping the index bytes of the existing spare record and the existing record thus making the existing spare record the updated record, or
   in the case of new data being appended to data of the existing record, the new data being written into a newly created spare record and the reassignment is carried out by swapping the index bytes of the newly created spare record and the existing record thus making the newly created spare record the updated record.

5. A transaction managing method according to claim 1, comprising:
   using on the smartcard a state-oriented processing scheme, setting said smartcard in either one of two states.

6. A transaction managing method according to claim 5, wherein the two states are:
   an old state, which is the state before a command was received, and/or
   a new state, which is the state envisaged to be achieved by executing said command.

7. A transaction managing method according to claim 1, comprising:
   defining an infinite state process on the smartcard, and,
   depending on the state said process is found to be in upon unsuccessful completion of the atomic transaction, calculating either a LRC of a spare record or a LRC of the existing record.

8. A smartcard for use in a secure transaction system between an external system and said smartcard, the latter comprising:
   means adapted for atomic processing and/or modification of an existing data record on said smartcard,
   means for monitoring whether said atomic transaction is successfully completed,
   means for executing a failure-resistant error recovery scheme, in particular a record index swapping scheme on said smartcard, and
   means for providing an LRC error correction scheme.

9. A smartcard according to claim 8, further including:
   means for determining whether said atomic transaction is successfully completed, and
   means for triggering internally on said smartcard, without external interaction, a record commitment and for modifying said existing record, and
   means for recovering lost data internally on said smartcard by exploiting available redundancy of said failure-resistant error recovery scheme.

10. A smartcard according to claim 8, further including:
    means for storing a spare record on the smartcard,
    means for writing modified data into said spare record, and
    means for updating and/or reassigning said spare record, said means for updating and/or reassigning being functionally dependant upon successful completion of the atomic transaction.

11. A smartcard according to claim 8, further including:
    means for executing a state-oriented processing scheme and for setting said smartcard into either one of two states, an old state, which is the state before a command was received, or a new state, which is the state envisaged to be achieved by executing a command.

12. A smartcard according to claim 8, further including:
    means for defining an infinite state process on the smartcard, and
    means for calculating either a LRC of a spare record or a LRC of the existing record, depending on the state said process is found to be in when unsuccessful completion of the atomic transaction is determined.

13. A transaction processing system with multiple processes, including an error correction process, and having smartcards with an addressable storage accessed by said processes, said system comprising:
    a user process to initiate an atomic transaction to modify an existing data record at a first storage address on said smartcard,
    an externally initiated management process to write the data to be modified into a second storage address on said smartcard,
    a internally initiated monitoring process to correct corrupted data in any of said storage addresses whenever said monitoring process indicates an error and/or other unsuccessful completion,
    an internally initiated address modification process to modify said addresses according to predefined rules, and
    a partial process to exploit an LRC error correction scheme by calculating the LRC of any corrupted record.

14. A transaction processing system according to claim 13, wherein
    the internally initiated address modification process is a process to execute a failure-resistant record index swapping scheme on the smartcard.

15. A transaction processing system according to claim 13, wherein
    the internally initiated recovery process is a state-oriented processing scheme, setting said smartcard in either one of two states, in particular:
    an old state, which is the state before the user process was initiated, and/or
    a new state, which is the state envisaged to be achieved by the atomic transaction.

16. An article of manufacture comprising a computer usable medium having computer readable program code means embodied therein for causing management of a transaction of data between an external system and a smartcard, said transaction using an error correction scheme, and implementing a data integrity scheme, the computer readable program code means in said article of manufacture comprising computer readable program code means for causing a computer to effect:

initiating an atomic transaction to modify an existing data record on said smartcard;

processing said atomic transaction;

monitoring on said smartcard whether said atomic transaction is successfully completed;

providing on the smartcard a failure-resistant recovery scheme, in particular a failure-resistant record index swapping scheme; and     using an LRC error correction scheme.

17. An article of manufacture according to claim 16, wherein the monitoring on the smartcard comprises:

determining whether the atomic transaction is successfully completed, and     if so, triggering internally on said smartcard, without external interaction, a record commitment and subsequently modifying the existing data record, or     if not, recovering lost data internally on said smartcard by exploiting available redundancy of the error correction scheme.

18. An article of manufacture as recited in claim 16, the computer readable program code means in said article of manufacture further comprising computer readable program code means for causing a computer to effect:

providing a spare record on the smartcard, first writing modified data into said spare record, and reassigning the spare record as an updated record only if the atomic transaction is successfully completed.

19. An article of manufacture according to claim 18, wherein in the case of new data replacing data of an existing record, the computer readable program code means in said article of manufacture further comprising computer readable program code means for causing a computer to effect:

writing the data into an existing spare record and carrying out the reassignment by swapping the index bytes of the existing spare record and the existing record thus making the existing spare record the updated record.

20. An article of manufacture according to claim 18, wherein in the case of new data replacing data being appended to date of the existing record, the computer readable program code means in said article of manufacture further comprising computer readable program code means for causing a computer to effect:

writing the data into a newly created spare record, and carrying out the reassignment by swapping the index bytes of the newly created spare record and the existing record thus making the newly created spare record the updated record.

21. An article of manufacture as recited in claim 16, the computer readable program code means in said article of manufacture further comprising computer readable program code means for causing a computer to effect using on the smartcard a state-oriented processing scheme setting said smartcard in either one of two states.

22. An article of manufacture as recited in claim 21, wherein the two states are:

an old state, which is the state before a command was received, and/or     a new state, which is the state envisaged to be achieved by executing said command.

23. An article of manufacture as recited in claim 16, the computer readable program code means in said article of manufacture further comprising computer readable program code means for causing a computer to effect:

defining an infinite state process on the smartcard, and,     depending on the state said process is found to in upon unsuccessful completion of the atomic transaction, calculating either a LRC of a spare record or a LRC of the existing record.

\* \* \* \* \*

UNITED STATES PATENT AND TRADEMARK OFFICE
CERTIFICATE OF CORRECTION

PATENT NO.    : 6,535,997 B1
DATED         : March 18, 2003
INVENTOR(S)   : Janson et al.

It is certified that error appears in the above-identified patent and that said Letters Patent is hereby corrected as shown below:

Column 16,
Lines 36-39, "a internally initiated monitoring process to correct corrupted data in any of said storage addresses whenever said monitoring process indicates an error and/or other unsuccessful completion," should be -- a internally initiated monitoring process to monitor successful completion of said atomic transaction, a internally initiated recovery process to correct corrupted data in any of said storage addresses whenever said monitoring process indicates an error and/or other unsuccessful completion, --.

Signed and Sealed this

Twelfth Day of August, 2003

JAMES E. ROGAN
*Director of the United States Patent and Trademark Office*